(12) United States Patent
Jarvis et al.

(10) Patent No.: US 6,297,502 B1
(45) Date of Patent: Oct. 2, 2001

(54) METHOD AND APPARATUS FOR FORCE CONTROL OF A SCANNING PROBE

(75) Inventors: Suzanne Philippa Jarvis; Mark Alfred Lantz, both of Tsukuba (JP); Urs Duerig, Rueschlikon (CH)

(73) Assignees: Angstrom Technology Partnership, Tokyo (JP); International Business Machines Corporation, Armonk, NY (US)

(*) Notice: Subject to any disclaimer, the term of this patent is extended or adjusted under 35 U.S.C. 154(b) by 0 days.

(21) Appl. No.: 09/258,817

(22) Filed: Feb. 26, 1999

(30) Foreign Application Priority Data

Jun. 30, 1998 (JP) .................................................. 10-183976

(51) Int. Cl.$^7$ .................................................. G01N 13/10
(52) U.S. Cl. .............................................. 250/307; 73/105
(58) Field of Search ................................... 250/306, 307; 250/423 F; 73/105

(56) References Cited

U.S. PATENT DOCUMENTS

| | | | |
|---|---|---|---|
| 5,376,790 | * 12/1994 | Linker et al. | 250/307 |
| 5,515,719 | 5/1996 | Lindsay . | |
| 5,557,156 | * 9/1996 | Elings | 250/306 |
| 5,908,981 | * 6/1998 | Atalar et al. | 73/105 |

FOREIGN PATENT DOCUMENTS

| | | |
|---|---|---|
| 47-27653 | 10/1972 | (JP) . |
| 1-259210 | 10/1989 | (JP) . |
| 4-369418 | 12/1992 | (JP) . |
| 8-075761 | 3/1996 | (JP) . |
| 8-201462 | 8/1996 | (JP) . |
| 9-159682 | 6/1997 | (JP) . |

OTHER PUBLICATIONS

H.J. Mamin, et al., Appl. Phys. Lett., vol. 61, No. 8, pp. 1003–1005, "Thermomechanical Writing with an Atomic Force Microscope Tip", Aug. 24, 1992.

S. P. Jarvis, et al., Mat Res. Soc. Symp. Pro., vol. 308, pp. 127–132, "Mechanics of Contacts at Less than 100 Å Scale: Indentation and AMF", 1993.

S. P. Jarvis, et al., Rev. Sci. Instrum., vol. 64, No. 12, pp. 3515–3520, "A Novel Force Microscope and Point Contact Probe", Dec. 1993.

M. A. Lantz, et al., Appl. Phys. Lett., vol. 65, No. 4, pp. 409–411, "Force Microscopy Imaging in Liquids Using AC Techniques", Jul. 25, 1994.

S. P. Jarvis, et al., Kluwer Academic Publishers, pp. 105–112, "Hydrophobic Surface Interactions Studied Using a Novel Force Microscope", 1995.

S. P. Jarvis, et al., Thin Solid Films, vol. 273, pp. 284–288, "Comparison of Hydrophobic Modifying Layers on $SiO_2$ Studied with a Force–Controlled Atomic Force Microscope", 1996.

S. P. Jarvis, et al., Review of Scientific Instruments, vol. 67, No. 6, pp. 2281–2285, "A New Force Controlled Atomic Force Microscope for Use in Ultrahigh Vacuum", Jun. 1996.

S. P. Jarvis, et al., Nature, vol. 384, No. 6606, pp. 247–249, "Direct Mechanical Measurement of Interatomic Potentials", Nov. 21, 1996.

(List continued on next page.)

Primary Examiner—Bruce C. Anderson
(74) Attorney, Agent, or Firm—Oblon, Spivak, McClelland, Maier & Neustadt, P.C.

(57) ABSTRACT

A method for controlling a force acting on a scanning probe of a cantilever by setting bandwidth of a feedback loop constituted by detecting minute displacement of the cantilever and controlling a force of the scanning probe to be greater than a primary resonant frequency of the cantilever.

6 Claims, 7 Drawing Sheets

OTHER PUBLICATIONS

S. Yamamoto, et al., Materials Research Society Symposium Proceedings, vol. 436, pp. 385–390, "Detection of Similar Elastic Properties Using a Magnetic Force Controlled AFM", 1997.

S. P. Jarvis, et al., Applied Physics Letters, vol. 70, No. 17, pp. 2238–2240, "Tip–Surface Interactions Studied Using a Force Controlled Atomic Force Microscope in Ultrahigh Vacuum", Apr. 28, 1997.

S. P. Jarvis, et al., Appl. Phys. vol. A 66, pp. S211–S213, "Feedback Stabilized Force–Sensors: A Gateway to the Direct Measurement of Interaction Potentials", 1998.

* cited by examiner

METHOD AND APPARATUS FOR FORCE CONTROL OF A SCANNING PROBE

BACKGROUND OF THE INVENTION

1. Field of the Invention

This invention relates to a method and apparatus for controlling a force acting on a scanning probe of a scanning probe microscope (SPM), particularly an atomic force microscope (AFM).

2. Description of the Prior Art

Magnetically controlled SPMs have been noted in the literature for some time however one limitation to their widespread introduction is the deposition of magnetic material onto the force sensor. Prior art has included the glueing of small magnetic particles directly behind the tip and the deposition of thin magnetic films either on the back side or tip side of the force sensor. The problem with both the former methods is that it is time consuming, difficult and not reproduceable from sensor to sensor making any detailed calibration of force difficult. In the latter method the applied force tends to be much smaller, the reproducibility is still poor, the films often cause bending of the lever and have a tendency to peel in liquid.

It has already been suggested that forces can be directly applied to a scanned probe by the application of a magnetic moment via a current carrying coil located behind the lever to a magnetic film or particle magnetized along the length of the cantilever. This configuration can be problematic as the application of a torque along this axis of the probe can result in both normal and lateral motion of the probe tip which is undersireable, for example in storage and lithography applications.

In addition when used in a feedback scheme the application of a moment is not always effective in balancing the normal forces acting on the tip, particularly when an optical deflection detection system is used, as this measures the local slope of the cantilever rather than the absolute displacement of the tip. This is particularly problematic for soft cantilevers, where feedback based systems are of most use.

The application of an attractive force to a magnetic particle magnetised perpendicular to the cantilever in order to compensate for attractive forces between the tip and sample is also disclosed in U.S. Pat. No. 5,515,719. This is very limiting as it assumes that the force is always applied via a coil above the lever to compensate for an attractive tip-surface force. For most AFMs it is more convenient to locate the coil behind the sample as suggested by JP-P-A HEI 9-159682. It is also impossible to stabilize the lever against high force gradients unless both attractive and repulsive forces can be applied over high bandwidth.

Surface force apparatus (SFA) and atomic force microscopy (AFM) have been applied to the study of specific interactions between surfaces. In both of these instruments the detection of the force acting relies on the measurement of the deflection of a compliant spring or cantilever. Under such conditions the surface mounted on the compliant cantilever will jump into contact with the other surface if it experiences a force gradient exceeding the magnitude of the lever stiffness or due to thermal or mechanical noise at very small separations. This can be avoided by using a stiff cantilever, however this results in a degradation of the force sensitivity.

In the case of force spectroscopy, lever instabilities are detrimental to data interpretation because they cause discontinuities in the force data at short interaction ranges which are usually the regions of most interest. In addition, the kinetic energy associated with such instabilities can generate large contact stresses that may physically damage the surfaces, dominate the resulting contact size and prevent repeatability of the measurement. In the case of AFM any damage sustained by the tip drastically reduces the resolution for subsequent imaging.

To reduce this problem feedback methods have been implemented in an attempt to artificially enhance the stiffness of the force sensor by applying compensating forces directly to the cantilever. The vital component of understanding missing from the existing methods is that the lever must be controlled at its resonant frequency in order to alter its effective stiffness. This is relatively easy with SFA due to the low resonant frequency of the system, however with microfabricated AFM cantilevers the resonant frequencies are normally much higher making the requirements of the feedback electronics much more stringent. This marked difference between macroscopic levers and microfabricated levers in the field of feedback stabilization has not been pointed out in literature or patent disclosure to date.

What has been shown is the use of feedback schemes in the low frequency regime where it is possible to maintain a constant lever deflection in a limited bandwidth. This is effective in damping low frequency noise, however these systems do not alter the resonance frequency which clearly demonstrates that they do not alter the effective stiffness of the cantilever.

As it is the value of this effective stiffness in relation to the force gradient which determines the stability of the cantilever in high force gradients it is obvious that these systems will only work when it is solely low frequency noise which is causing the jump to contact. Further, it will not be possible to measure a force gradient greater than the stiffness of the lever.

The present invention has been proposed in view of the prior art drawbacks mentioned above and has as its object to provide a method and apparatus for controlling a force acting on a scanning probe of a cantilever, that can alter the effective stiffness of the cantilever and measure a force gradient greater than the stiffness of the cantilever.

SUMMARY OF THE INVENTION

To attain the above object, the present invention provides a method for controlling a force acting on a scanning probe of a cantilever, comprising the steps of detecting minute displacement of the cantilever to obtain a displacement signal and controlling a force of the scanning probe prone to contact a sample on the basis of the displacement signal and wherein a bandwidth of a feedback loop constituted by these steps is set to be higher than a primary resonant frequency of the cantilever.

The present invention also provides an apparatus for controlling a force acting on a scanning probe, comprising a detection unit for detecting minute displacement of a cantilever having a scanning probe to output a displacement signal, a control signal generating circuit for converting the displacement signal into an electric signal, a magnetic field control unit for controlling a force acting on the scanning probe, and a drive unit for driving the magnetic field control device, and wherein the detection unit, control signal generating circuit and magnetic field control unit constitute a feedback loop having a bandwidth set to be greater than a primary resonant frequency of the cantilever.

The control method can utilize a torque not directed to the direction of the length of the cantilever.

In the control method, the cantilever can be used in a form where a soft magnetic material is attached thereto. In this case, the cantilever is magnetized using a permanent magnet or electric coil.

In the control method, the cantilever is provided with at least one electric coil while an external permanent magnet or secondary electric coil is utilized to directly induce a force on the cantilever.

Further features of the invention, its nature and various advantages will be more apparent from the accompanying drawings and following detailed description of the invention.

DESCRIPTION OF PREFERRED EMBODIMENT

Figure 1:
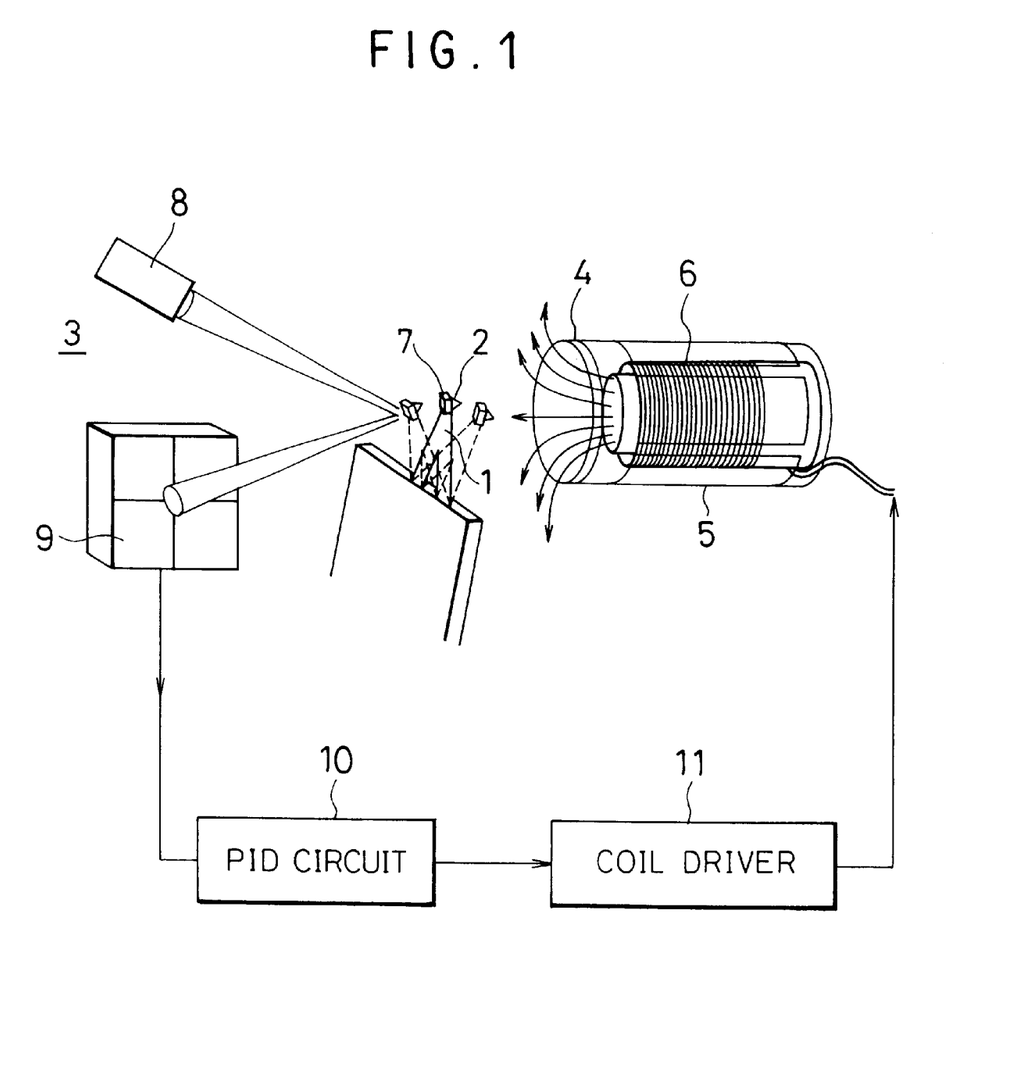
FIG. 1 is a schematic view showing a feedback mechanism of a scanning probe force control apparatus according to the present invention.

A method for controlling a force acting on a scanning probe according to the present invention will be described with reference to a scanning probe microscope shown in FIG. 1.

The scanning probe microscope comprises a cantilever 1 having a tip lower surface provided with a scanning probe 2, a detection unit 3 for detecting minute displacement of the cantilever 1 to output a displacement signal, a quartered photodiode 9 for converting the displacement signal into an electrical signal, a control signal generating circuit (PID circuit) 10 for processing the electrical signal for effective feedback, a position control unit 5 for controlling a position of a sample 4, a magnetic field control unit 6 for controlling a force acting on the scanning probe 2, and a driver 11 for driving the magnetic field control unit 6.

The magnetic field control unit 6 in this embodiment comprises a core and a coil wound about the core, is disposed inside a hollow portion of the position control unit 5, and applies a magnetic field to a magnetic member 7 attached to the cantilever 1, thereby controlling a force acting on the scanning probe 2.

In this embodiment the detection unit 3 utilizes an optical detecting method using a semiconductor laser 8 and the quartered photodiode 9. However, a detection method using laser interference, a tunnel current or the like can be used instead. It is important for the method to work that delay between detection of the lower displacement and the application of a restoring feedback force is short in comparison with the reciprocal resonance frequency of the lever.

In the present invention, the bandwidth of a feedback loop comprising the detection unit 3, PID circuit 10, coil driver 11 and electromagnet 6 is set to be higher than the primary resonant frequency of the cantilever 1.

Now the force feedback mechanism will be described.

The feedback scheme consists of a force sensing lever which converts the force into a displacement. This displacement is detected and converted into a compensating force as suggested by the schematic view shown in FIG. 1. The response of the force sensor is described by the complex transfer function $G_1(\omega)$. Disregarding higher order modes, $$\text{one has } G_1(\omega)=C\omega_0^2/(\omega_0^2-\omega^2+j\omega\omega_0/Q) \tag{1}$$

wherein C is the stiffness of the lever and $\omega_0$ is the resonance frequency of the free lever. For an ideal feedback amplifier with a gain of K the effect of the feedback is to increase the lever stiffness by a factor (K+1) and hence, to shift the resonance frequency by a factor of $\sqrt{(K+1)}$. The new resonance frequency corresponds in essence to the frequency at which the loop gain $|G_1(\omega_k)|*K$ is equal to 1. The important quantity which determines the robustness of a feedback system is the so-called phase margin, $\Delta\Phi$, which is the phase difference from $\pi$ radians at a loop gain of 1. The phase margin is inversely proportional to Q and $\sqrt{(K+1)}$ (Note that the phase margin is given by the ratio of the imaginary part divided by the real part of $G_1(\omega)$ of the new resonance frequency $\omega_k=\sqrt{(K+1)}\omega_0$).

Figure 2:
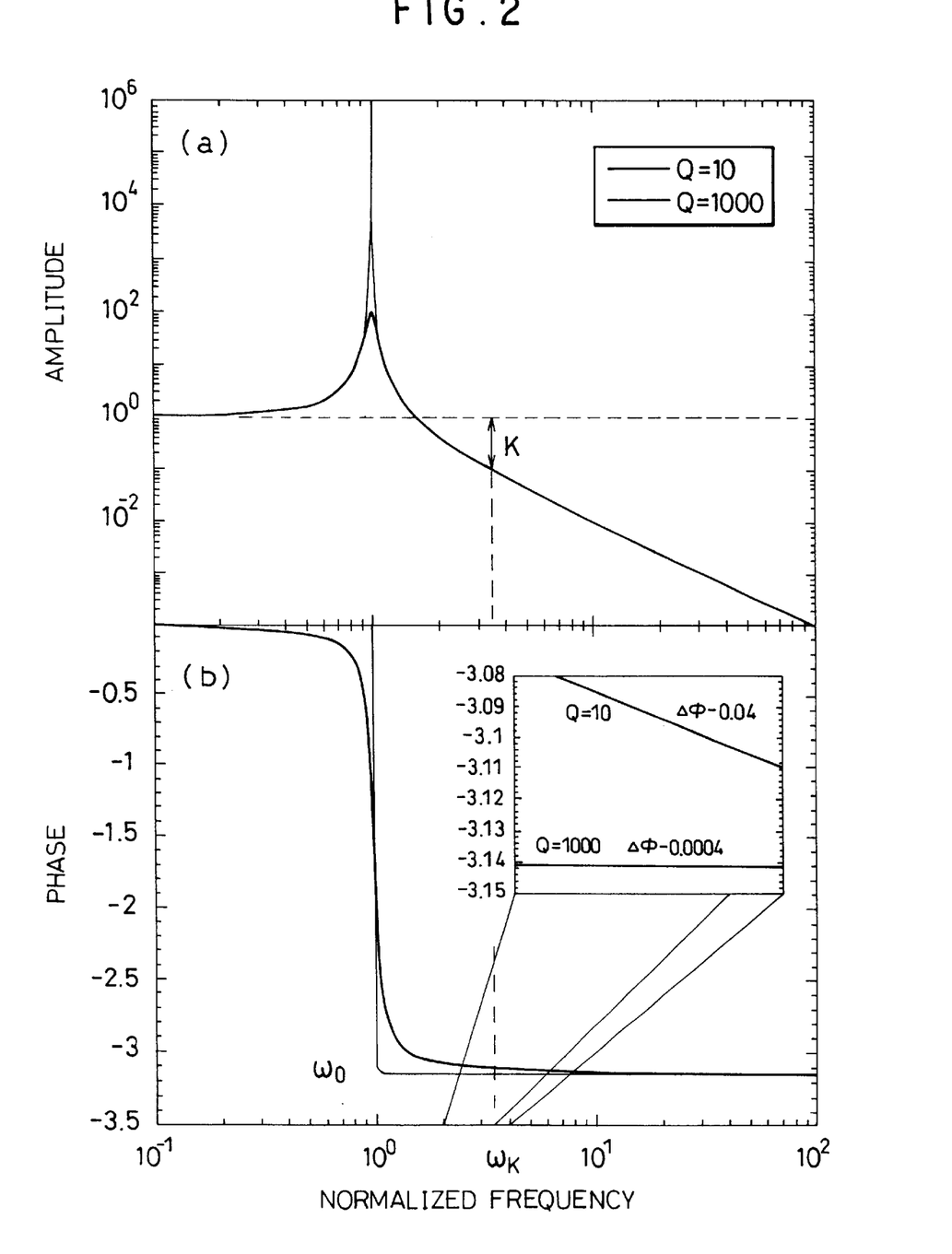
FIG. 2 is a characteristic diagram illustrating the need for high bandwidth feedback and the problem associated with high Q structures.

In FIG. 2, with the gain K=9, it can be seen that the phase margin $\Delta\Phi$ is extremely small, namely of the order of $\Delta\Phi\sim4*10^{-2}$ radians for Q=10 and $\Delta\Phi\sim4*10^{-4}$ radians for Q=1000, restively.

In practice, an ideal amplifier does not exist and thus the response of the feedback amplifier cannot be instantaneous. In particular, the bandwidth is limited to some finite value $\omega_{max}$ and correspondingly, the transfer function will be proportional to a low pass filter term $1/(1+i\omega/\omega_{max})$. It is important to realize, that such a term introduces an appreciable additional phase shift well below the cut-off frequency $\omega_{max}$. In order for the feedback system to be stable this additional phase shift, which is of the order of $\omega/\omega_{max}$, must be smaller than the phase margin $\Delta\Phi$ of the resonator.

Explicitly one has:

$$\omega_{max} > Q(K+1)\omega_o \quad (2)$$

Substituting typical values for AFM in ultrahigh vacuum (UHV) with typical values of Q=1000 and $\omega_o$=20 kHz demands a bandwidth of 200 MHz. Thus for most AFM applications using microfabricated cantilevers the simple direct feedback method is impractical because of excessive bandwidth requirements.

One way of solving the problem is to decrease the effective Q-factor of the lever by means of active damping. This corresponds to adding a differential feedback term. The transfer function of such a proportional-differential (PD) controller is:

$$G_{PD}(\omega) = K(1 + i\omega/\omega_D) \quad (3)$$

where $\omega_D$ is the crossover frequency delimiting the proportional gain regime at low frequencies from the differential gain regime at high frequencies. Due to bandwidth limitations, the actual transfer function must be represented as $G_{PD}(\omega)*LP(\omega)$ where $LP(\omega)$ is a low pass filter transfer function of at least 2nd order. In order to achieve stable operation the crossover frequency $\omega_D$ must be carefully chosen such that sufficient phase margin is provided to compensate for the phase shift due to gain roll-off at high frequency. If we assume that the dominant term of the $LP(\omega)$ is given by $1/(1+i\omega/\omega_{max})^2$ the condition reads:

$$\omega_D < \omega_{max}/2 \quad (4)$$

Note that as a result of the differential feedback the Q-factor of the lever has no effect on the stability anymore. Instead, stability is entirely determined by the phase margin provided by the differential feedback. For example, assume a control system bandwidth $\omega_{max}$=10$\omega_o$. From equation (3) it follows that $\omega_D$ should be smaller than 5$\omega_o$. With $\omega_D$=3$\omega_o$ one can actually achieve stable operation for K values as large as 20 (corresponding to an effective lever stiffness 21 times greater than the free lever stiffness) for which the new resonance frequency is approximately 4.5 $\omega_o$, almost approaching the bandwidth limit. The frequency $\omega_{max}$ represents an absolute upper limit for the shifted resonance frequency $\omega_k$ and thus one has $K < (\omega_{max}/\omega_0)^2$. How closely one can approach this theoretical limit is determined by the amount of differential gain in the loop and thus by $\omega_D$.

Figure 3:
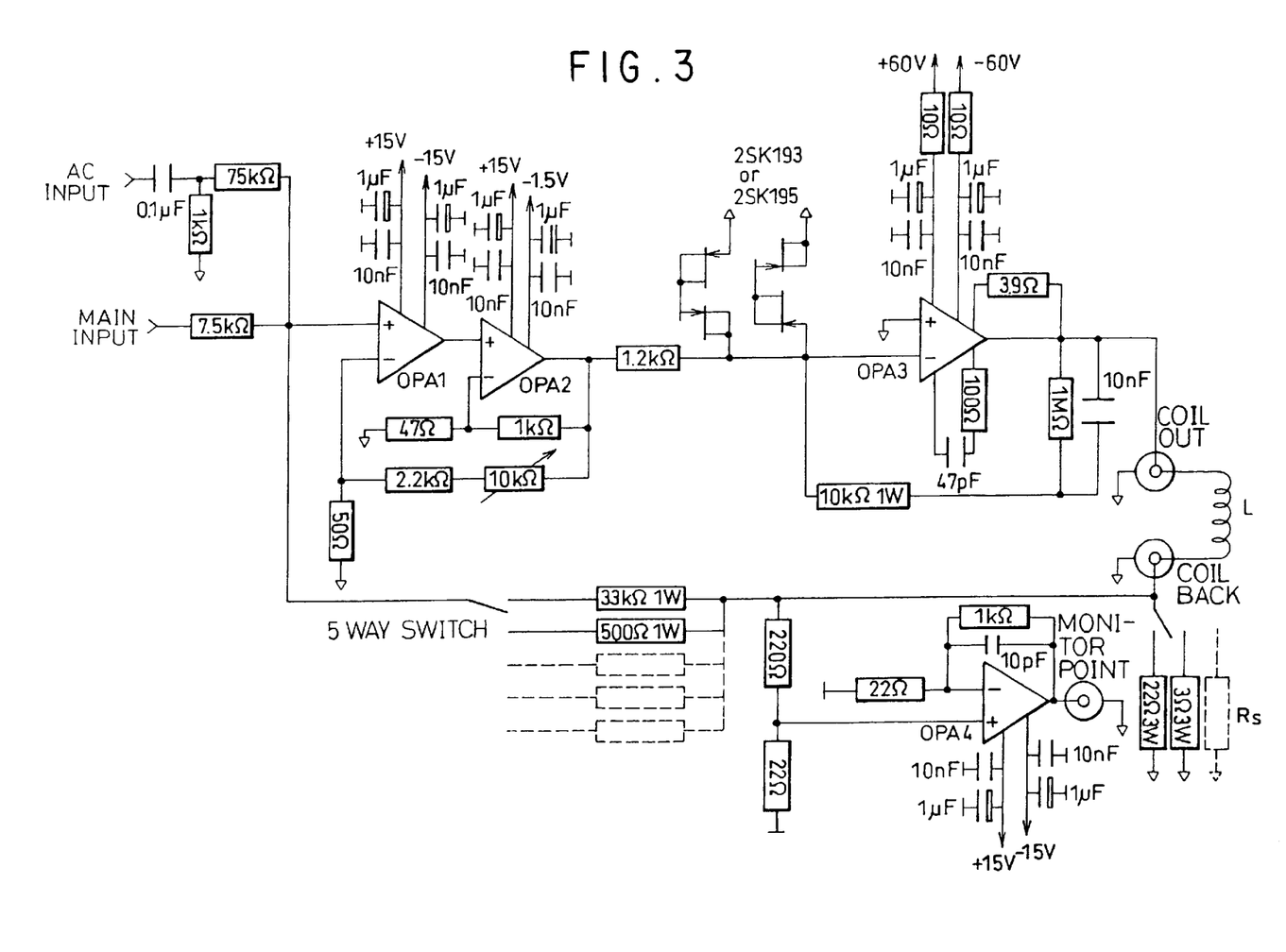
FIG. 3 is a circuitry diagram showing one example of a driver for driving an electromagnetic coil at a high bandwidth.

A band width of 100 kHz is demanding for a circuit containing optical deflection sensors and an inductive load, in other words, the current carrying coil in the magnetic force setup. However, with careful consideration of the bandwidth limitations of all elements in the feedback loop it is possible to implement a feedback scheme in which the effective lever stiffness can be controlled. An example of a suitable coil driver 11 is shown in FIG. 3.

The coil driver is in principle a floating current source. The coil acts as an inductive load of L=3.1 mH and the current is sensed by measuring the voltage drop across a 22 $\Omega$ sense resistor, $R_s$, connected in series with the coil to ground. The coil and the sense resistor form a voltage divider with a flat unity response up to a crossover frequency $f_c = R_s(2\pi L) = 1$ kHz and 1/f roll-off for frequencies greater than $f_c$. Hence, it follows that the loop gain of the amplifier must be greater than $f_{max}/f_c$=1000 where $f_{max}$=1 MHz is the bandwidth of the coil driver. In addition, stability of the feedback circuit requires that the overall open loop phase lag of the combined system of the amplifier, coil-sense-resistor and voltage divider, be less than 135 degrees below the open loop unity gain frequency $f_o$.

This requirement is equivalent to saying that the open loop gain roll-off of the combined system shall be of the order 1/f for f<$f_o$. Given these constraints the feedback amplifier is built using two separate gain stages. The first stage comprising amplifiers OPA1 (OPA27P, Burr Brown) and OPA2 (OPA603P, Burr Brown) provides a flat voltage gain with a bandwidth in excess of 10 MHz. The voltage gain can be adjusted in the range between 50 and 250. The second stage comprising OPA3 (PA85, Apex) is high voltage current boost amplifier acting as an integrator below $f_c$ and as a constant gain amplifier (amplification factor of 8) up to a frequency of approximately 2 MHz. Thus, an overall amplifier gain of 2000 is provided at $f_{max}$ which provides sufficient gain margin for achieving a 1 MHz closed loop bandwidth. Moreover, the frequency response of the system is compatible with stability requirements.

The four field effect transistors (2SK193 or 2SK195, NEC) at the inverting input terminal of OPA3 provide over voltage protection for this amplifier. OPA4 (OPA603P, Burr Brown) serves as buffer amplifier for monitoring the voltage drop across the current sense resistor. Three parameters can be adjusted independently for optimizing the performance under a wide variety of load and operating conditions:

(1) The current sense resistor $R_s$ must be adjusted such that an $f_c$ of 1 kHz is obtained (i.e. 22 Ohm for a coil inductance of 3.1 mH).

(2) The overall closed loop current transfer gain with respect to the main input voltage is adjusted by means of feedback resistor $R_f$. The coil current is $(R_f/7.5 \text{ k}\Omega)/R_s$ A/V (=0.2 A/V for $R_s$=22$\Omega$ and $R_f$=3.3 k$\Omega$). In addition an AC input with a 10 times reduced sensitivity is provided.

Figure 4:
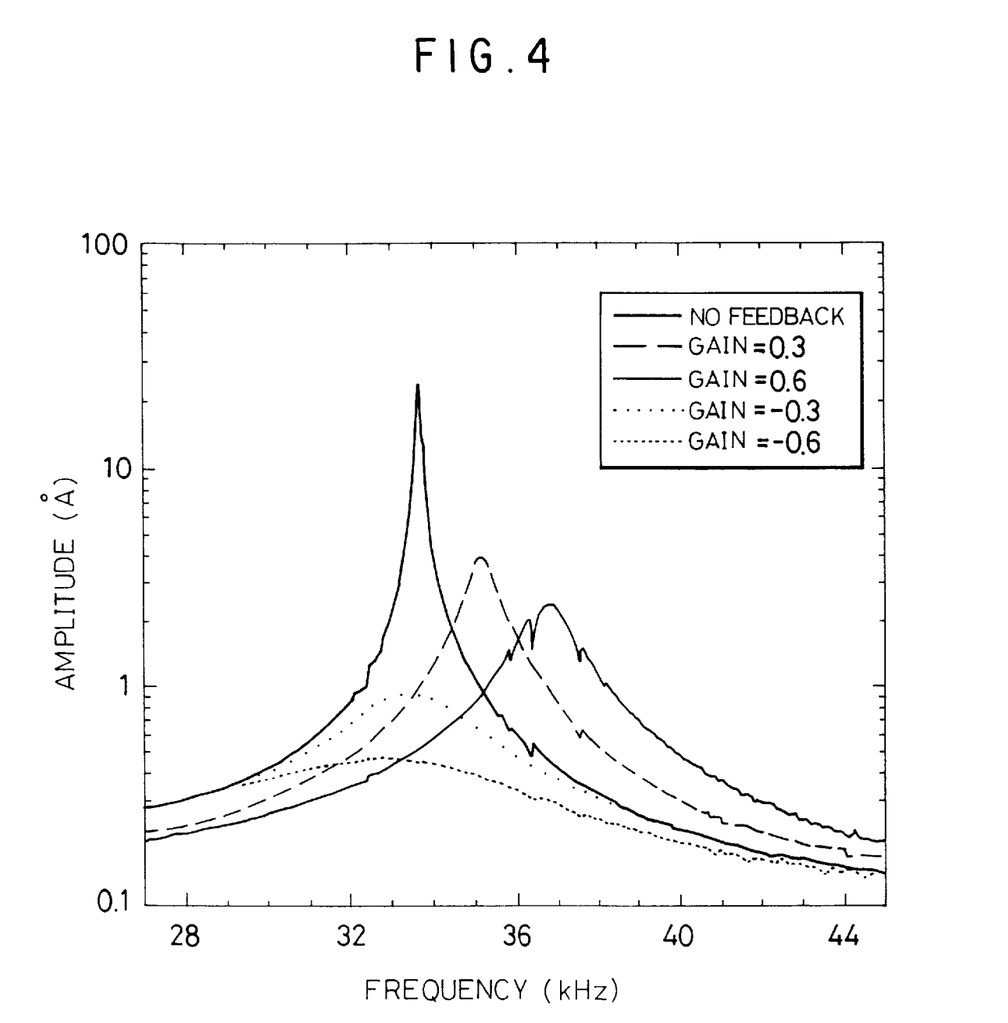
FIG. 4 is a characteristic diagram demonstrating the real experimental operation of the feedback.

(3) The feedbadck amplifier gain is adjusted by means of 10 k $\Omega$ potentiometer $R_s$. The gain adjustment serves the purpose of optimizing the closed loop bandwidth according to gain setting $R_f$ and sense resistor $R_s$ used in the circuit. The gain must be adjusted such that the open-loop voltage gain at $f_{max}$ of the combined amplifier comprising OPA1-3 is equal to $(27 \pi H f_{max}/R_s) (R_f/7.5 \text{ k }\Omega.)$ The working embodiment of this set-up is best demonstrated by showing shifts in the resonant frequency with the feedback active as seen in FIG. 4. These results were obtained with an adapted Seiko AFM operating in air. The Seiko AFM has a configuration substantially the same as that of AFM shown in FIG. 1, consists of a sample stage and approach mechanism, a cantilever holder and an optical beam deflection detection system, control electronics and a computer, and is modified for application of magnetic force feedback by placing a magnetic coil under the sample and incorporating a coil driver and a PID circuit. According to this system including the Seiko AFM, the tuning of stiffness of the cantilever in a negative direction is also possible and can be useful in that it reduces the contact stiffness and increases the response time during scanning over that of a traditional piezo feedback scheme.

Finally it should be noted that the thermal oscillation inherent in the lever depends on the effective stiffness of the lever. In addition to preventing lever instabilities the above method can also be useful to tune the thermal oscillation amplitude for example when tying to measure very small solvation shells such as in water for example. The thermal oscillations could be reduced at very small separations in order not to disrupt the ordering of the liquid.

In general it is believed that the response time of the cantilever is limited by its resonance frequency. There is, however, a way around this limit by means of ballistic excitation. For example, in the case of writing a bit by indenting the tip of an AFM into some recording medium, i.e. polyimide (see Mamin et al., Appl. Phys. Lett. 61, 1003 (1992)) the speed of the writing process is basically limited by the mechanical eigenfrequency of the lever and the duration of the heat pulse required for local melting of the substrate. This process can be speeded up by at least an order of magnitude if a high force pulse is exerted during writing which basically gives a ballistic kick to the lever. Indentation can be stopped by applying a similar pulse in the opposite direction.

In principle one can conceive a storage system with writing speeds of the order of 10 to 100 MHz with state of the art micromechanical sensors, Similar ideas could be implemented in the imaging mode as well. In this case the probe tip is oscillated ballistically at a high frequency, i.e. 10 MHz similar to the conventional tapping mode. If the tip touches the surface, the deflection signal will be distorted, a fact that can be measured with great accuracy using correlation techniques. Thus it is possible to record a sampled picture at a rate far exceeding the resonance frequency of the lever.

Figures 5A, 5B, 5C, 5D, 5E:
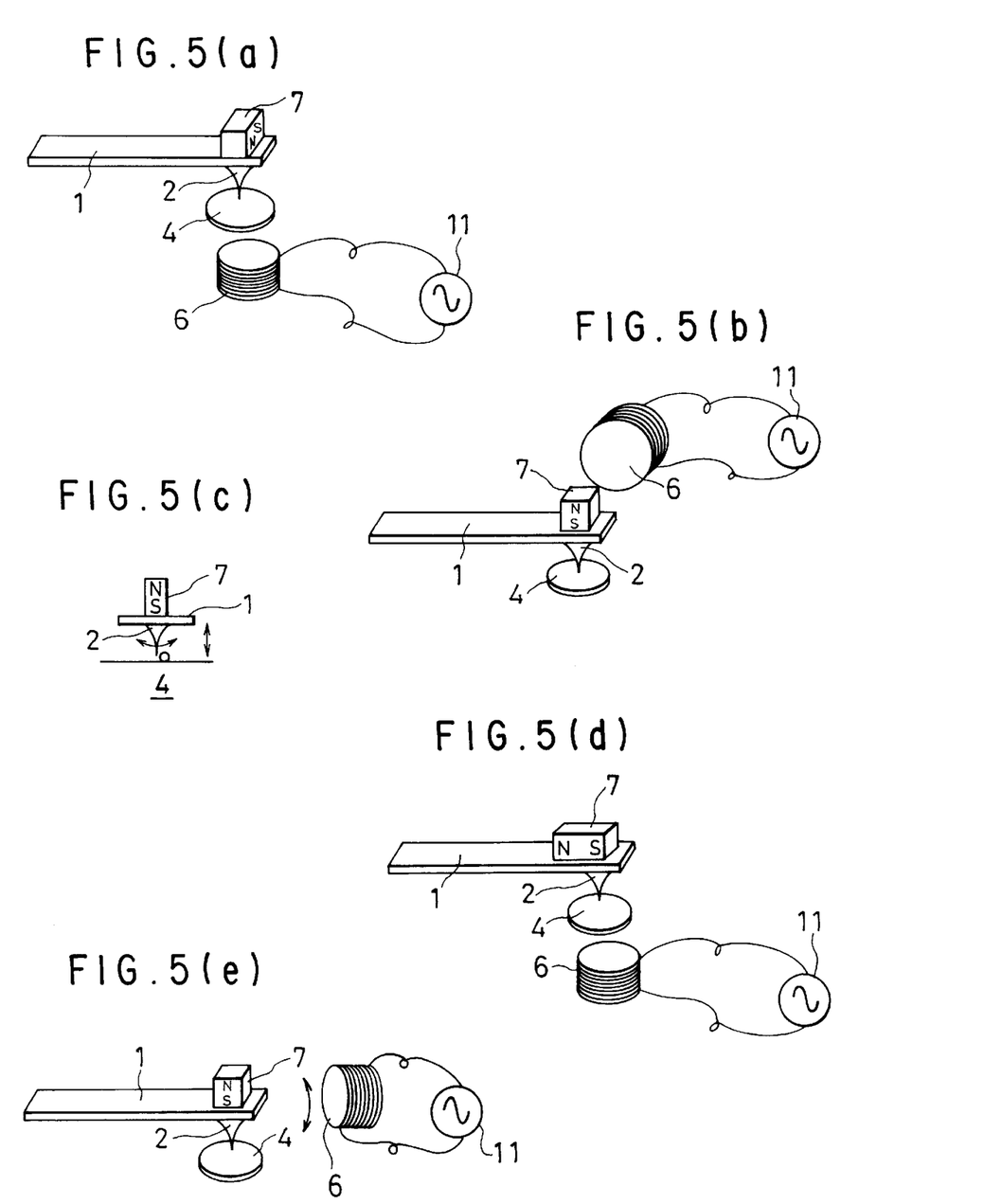
FIG. 5(a) is a schematic view showing one example of the configuration for the application of a lateral torque and its proposed use.
FIG. 5(b) is a schematic view showing another example of the configuration for the application of a lateral torque and its proposed use.
FIG. 5(c) is a schematic view showing still another example of the configuration for the application of a lateral torque (in the direction of the width of a cantilever) and its proposed use.
FIG. 5(d) is a schematic view showing yet another example of the configuration for the application of a lateral torque and its proposed use.
FIG. 5(e) is a schematic view showing a further example of the configuration for the application of a lateral torque and its proposed use.

FIG. 5 is a schematic view showing the force control of the scanning probe that is conducted by variously changing the magnetic polarity of the magnetic member 7 provided on the cantilever 1 and the position of the magnetic field control unit 6. The detection unit and PID circuit are omitted from FIG. 5.

The permanent magnet 7 is disposed on the cantilever 1 so that a torque is applied to the cantilever 1 as shown in FIG. 5(a) by the field coil 6 disposed below the magnet 7 or so that its magnetic field is directed vertical as shown in FIG. 5(b) with the field coil 6 disposed aside the magnet 7. With this arrangement, by applying a torque along the width of the cantilever it is possible to rotate the end section of the lever to make friction measurements rather than oscillating the sample as is the prior art to date. It is also possible to combine this method with scanning near field optical microscopy for shear force distance detection.

As an extension of this by combination with the feedback method described above the lateral stiffness can be tuned down using feedback so that ordinary levers become more useable for lateral stiffness measurements in high force gradients (as is probably the case for single atom or molecular manipulation). Tuning up the lateral stiffness can be used to avoid stick slip motion of the cantilever during lateral force measurements.

Manipulation over small distances can also be done via motion of the tip depending on the length of the tip. This could be done with a magnet perpendicular to the lever. With that arrangement would it be possible to simultaneously control the height and lateral motion of the probe tip, providing the cantilever is sufficiently flexible as shown in FIG. 5(c), for example. Further, the blank circle in FIG. 5(c) represents an object such as an atom, or molecule or cluster of atoms on the surface of the sample 4.

When using a soft cantilever and arranging the permanent magnet 7 and the field coil 6 in position as shown in FIG. 5(d) or FIG. 5(e), friction measurements are also possible at 90 degrees to the standard d on for lateral force microscopy. Using feedback it is possible to make the torsional stiffness equal to the other torsional stiffness of the cantilever so that comparable friction measurements can easily be made on anisotropic samples. Scanning along different axes of the sample without having to worry about buckling of the lever is particularly interesting for investigating anisotropy and investigating imaging artifacts.

Figure 6A:
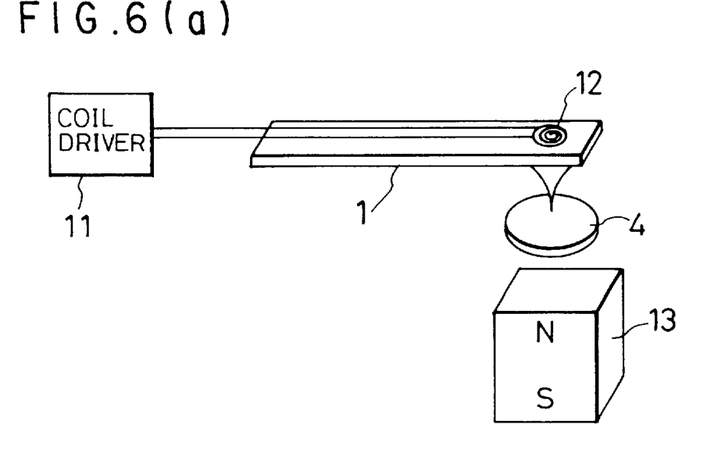
FIG. 6(a) is a schematic view showing one example of the configuration for the application of a magnetic force using a microfabricated coil.
Figure 6B:
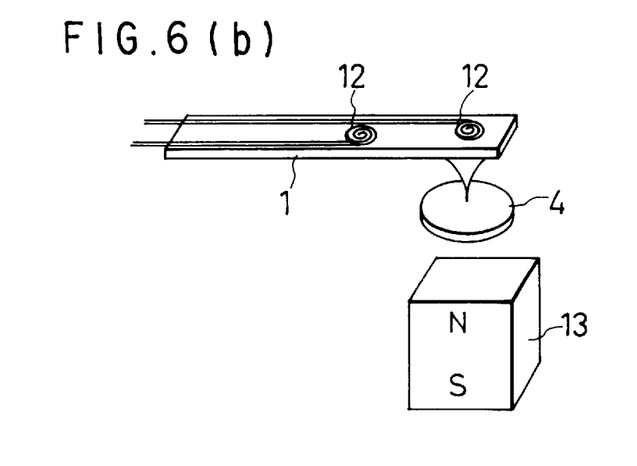
FIG. 6(b) is a schematic view showing another example of the configuration for the application of a magnetic force using microfabricated coils.
Figure 6C:
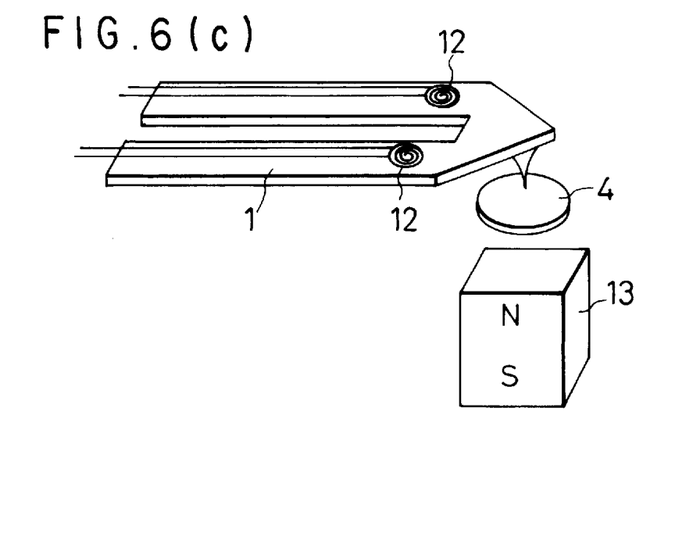
FIG. 6(c) is a schematic view showing still another example of the configuration for the application of a magnetic force using microfabricated coils.

FIGS. 6(a), 6(b) and 6(c) illustrate examples in which a coil 12 is microfabricated directly onto the cantilever 1 by lithographically fusing conductive material to the lever and etching the conductive material to remove unnecessary part This lithographic fabrication affords a good magnetic characteristic to the coil relative to an electric current applied to the coil. Therefore, it is possible to mass produce levers for which the magnetic field is accurately known. This is not only useful for reproducibility of particular experimental conditions but also for calibrating the stiffness of the force sensor, a parameter essential for quantitative experiments and usually calculated from the dimensions introducing errors of the order of 30%.

Another advantage of this set-up is that the coil can be lithographically placed directly behind the tip. Coils may also be placed elsewhere along the length as shown in FIG. 6(c) to force the lever to vibrate in different modes and enable different modes of excitations to be detected.

Different coils can have reverse wiring in order to apply attractive and repulsive forces at different points along the lever. The coil configuration can also be used as a detection system (analogous to the microphone). Feedback can also be implemented with either of the above configurations and the fabricated nature of the coils is ideal for the production of arrays of cantilevers.

Figure 7A:
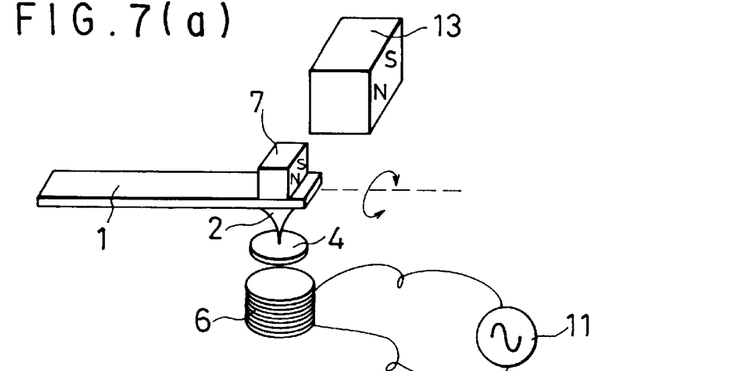
FIG. 7(a) is a schematic view showing an example of the configuration for varying the direction of the applied torque using a soft magnetic material.
Figure 7B:
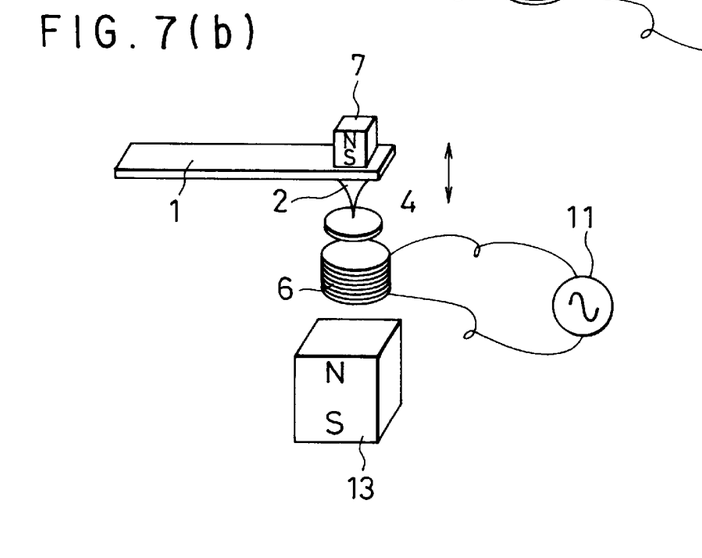
FIG. 7(b) is a schematic view showing another example of the configuration for varying the direction of the applied torque using a soft magnetic material.
Figure 7C:
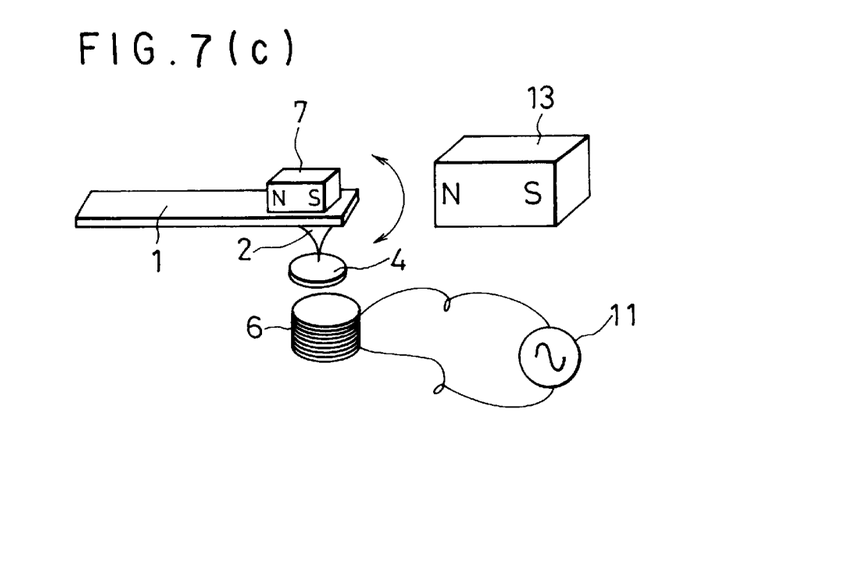
FIG. 7(c) is a schematic view showing still another example of the configuration for varying the direction of the applied torque using a soft magnetic material.

Another convenient way of applying a magnetic force is to place a soft magnetic material at the end of the cantilever which can be magnetized in situ in order to chose the most appropriate direction of magnetization and be able to change it from one experiment to the next. This configuration adds much versatility to the application of a magnetic force and is illustrated in FIG. 7.

Obviously, numerous modifications and variations of the present invention arc possible in light of the above teaching. It is therefore to be understood that within the scope of the appended claims, the invention may be practiced otherwise than a specifically described herein.

As has been described in the foregoing, the present invention relates to a system for controlling a scanning probe using an arbitrary force including magnetic force, electrostatic force, piezo electric force and bimetallic force that enables a cantilever with the scanning probe to be used in an optimal state by setting the bandwidth of a feedback loop to be higher than the primary resonant frequency of the cantilever.

What is claimed is:

1. A method for controlling a force acting on a scanning probe of a cantilever, comprising the steps of:
   detecting minute displacement of the cantilever to obtain a displacement signal, and
   controlling a force of the scanning probe prone to contact a sample on the basis of the displacement signal, and
   wherein a bandwidth of a feedback loop constituted by these steps is set to be higher than a primary resonant frequency of the cantilever.

2. The method according to claim 1, further comprising the step of utilizing a torque not directed to the direction of the length of the cantilever.

3. The method according to claim 2, wherein the cantilever is magnetized by using a soft magnetic material attached to the cantilever and a permanent magnet or electric coil.

4. The method according to claim 2, wherein the cantilever is provided with at least one electric coil while an external permanent magnet or secondary electric coil is utilized to enable direct application of a force to the cantilever.

5. The method according to claim 1, wherein the cantilever is provided with at least one electric coil while an external permanent magnet or secondary electric coil is utilized to enable direct application of a force to the cantilever.

6. An apparatus for controlling a force acting on a scanning probe, comprising:

a cantilever having a tip provided with a scanning probe, a detection unit for detecting minute displacement of the cantilever to output a displacement signal;

a control signal generating circuit for converting the displacement signal into an electric signal;

a position control unit for controlling a position of a sample;

a magnetic field control unit for controlling a force acting on the scanning probe; and a drive unit for driving the magnetic field control device; and wherein the measuring unit, control signal generating circuit and magnetic field control unit constitute a feedback loop having a bandwidth set to be greater than a primary resonant frequency of the cantilever.

* * * * *